US008811358B2

(12) United States Patent
Mahler et al.

(10) Patent No.: US 8,811,358 B2
(45) Date of Patent: *Aug. 19, 2014

(54) NETWORK-INITIATED METHOD AND SYSTEM FOR ESTABLISHING DATA COMMUNICATION USING IP WITH A WIRELESS TERMINAL

(75) Inventors: Roger Newall Mahler, Marietta, GA (US); Mark J. Enzmann, Blairsville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 243 days.

This patent is subject to a terminal disclaimer.

(21) Appl. No.: 13/080,429

(22) Filed: Apr. 5, 2011

(65) Prior Publication Data

US 2011/0182242 A1    Jul. 28, 2011

Related U.S. Application Data

(63) Continuation of application No. 10/980,306, filed on Nov. 4, 2004, now Pat. No. 7,940,730.

(51) Int. Cl.
| | |
|---|---|
| H04W 4/00 | (2009.01) |
| H04W 40/00 | (2009.01) |
| H04W 80/00 | (2009.01) |
| H04L 12/28 | (2006.01) |
| G06F 15/16 | (2006.01) |
| H04W 8/26 | (2009.01) |
| H04W 76/02 | (2009.01) |
| H04W 80/04 | (2009.01) |
| H04W 84/12 | (2009.01) |
| H04L 29/06 | (2006.01) |
| H04L 12/24 | (2006.01) |
| H04L 29/12 | (2006.01) |

(52) U.S. Cl.
CPC .............. *H04W 8/26* (2013.01); *H04W 76/02* (2013.01); *H04W 80/04* (2013.01); *H04W 84/12* (2013.01); *H04L 29/06027* (2013.01); *H04L 29/06095* (2013.01); *H04L 29/06326* (2013.01); *H04L 41/0213* (2013.01); *H04L 61/2007* (2013.01)
USPC ...... 370/338; 370/349; 370/352; 370/395.52; 455/445; 455/452.1; 455/458; 709/223; 709/227

(58) Field of Classification Search
CPC ........... H04W 4/00; H04W 8/00; H04W 8/26; H04W 28/00; H04W 76/02; H04W 80/00; H04W 80/04; H04W 84/12; H04L 12/56; H04L 12/66; H04L 29/06; H04L 41/00; H04L 61/2007; H04L 65/1003; H04L 67/141; H04L 69/08; H04L 29/06027; H04L 29/06095; H04L 29/06326; H04L 29/08576; H04L 41/0213; H04L 65/1066; H04L 65/1069
USPC ............. 370/338, 349, 352, 395.52; 455/445, 455/452.1, 458; 709/223, 227
See application file for complete search history.

(56) References Cited

U.S. PATENT DOCUMENTS

| | | | |
|---|---|---|---|
| 6,374,295 B2 | 4/2002 | Farrow et al. | |
| 6,469,998 B1 * | 10/2002 | Burgaleta Salinas et al. | 370/338 |
| 6,631,259 B2 | 10/2003 | Pecen et al. | |
| 6,671,511 B1 * | 12/2003 | Forssell et al. ............. | 455/452.1 |
| 6,687,252 B1 * | 2/2004 | Bertrand et al. ............. | 370/401 |
| 6,944,459 B2 * | 9/2005 | Parantainen et al. ...... | 455/452.1 |
| 6,956,820 B2 | 10/2005 | Zhu et al. | |
| 7,035,260 B1 | 4/2006 | Betta et al. | |
| 7,054,268 B1 * | 5/2006 | Parantainen et al. ......... | 370/231 |
| 7,061,894 B2 * | 6/2006 | Pang et al. .................... | 370/338 |
| 7,068,598 B1 | 6/2006 | Bryson et al. | |
| 7,068,646 B2 | 6/2006 | Fangman et al. | |
| 7,110,767 B2 * | 9/2006 | Motegi et al. ................. | 455/445 |
| 7,193,987 B2 | 3/2007 | Vilander | |
| 7,269,425 B2 * | 9/2007 | Valko et al. ................. | 455/456.1 |
| 7,277,929 B2 * | 10/2007 | Ohara ........................... | 709/219 |
| 7,281,137 B1 | 10/2007 | Vitikainen | |
| 7,356,841 B2 | 4/2008 | Wilson et al. | |
| 7,424,025 B2 | 9/2008 | Qian et al. | |
| 7,502,335 B2 * | 3/2009 | Lin ............................... | 370/278 |
| 7,564,784 B2 * | 7/2009 | Forssell et al. ................ | 370/230 |
| 7,593,364 B2 | 9/2009 | Asthana | |

| | | |
|---|---|---|
| 7,643,470 B2 | 1/2010 | Herledan et al. |
| 7,864,665 B2 | 1/2011 | Shei et al. |
| 2002/0131395 A1* | 9/2002 | Wang .......................... 370/349 |
| 2002/0138622 A1 | 9/2002 | Dorenbosch et al. |
| 2002/0176378 A1 | 11/2002 | Hamilton et al. |
| 2002/0186696 A1 | 12/2002 | Lim |
| 2003/0058855 A1 | 3/2003 | Feyerabend et al. |
| 2003/0060210 A1* | 3/2003 | Ravishankar et al. ........ 455/452 |
| 2005/0020234 A1* | 1/2005 | Iivari et al. .................... 455/403 |
| 2005/0101245 A1* | 5/2005 | Ahmavaara ..................... 455/1 |
| 2005/0113114 A1 | 5/2005 | Asthana |
| 2005/0169223 A1 | 8/2005 | Crocker et al. |
| 2006/0003772 A1 | 1/2006 | Semper |
| 2006/0031368 A1* | 2/2006 | deCone ......................... 709/207 |

FOREIGN PATENT DOCUMENTS

| | | |
|---|---|---|
| EP | 1198933 | 4/2002 |
| WO | WO 02/077842 | 10/2002 |

OTHER PUBLICATIONS

U.S. Office Action dated Jan. 17, 2008 in U.S. Appl. No. 10/980,306.
U.S. Office Action dated Jul. 22, 2008 in U.S. Appl. No. 10/980,306.
U.S. Office Action dated Feb. 25, 2009 in U.S. Appl. No. 10/980,306.
U.S. Office Action dated Sep. 11, 2009 in U.S. Appl. No. 10/980,306.
U.S. Office Action dated Mar. 25, 2010 in U.S. Appl. No. 10/980,306.
U.S. Office Action dated Aug. 17, 2010 in U.S. Appl. No. 10/980,306.
U.S. Notice of Allowance dated Jan. 6, 2011 in U.S. Appl. No. 10/980,306.

\* cited by examiner

*Primary Examiner* — Alpus H Hsu

(74) *Attorney, Agent, or Firm* — Hartman & Citrin LLC

(57) ABSTRACT

A method and apparatus are provided for establishing data communication between a wireless network and a wireless terminal by means of a packet data protocol connection, using internet protocol. When a determination is made that the wireless terminal is active but does not have an internet protocol address, a page is initiated from the wireless network to the wireless terminal over a control channel requesting that the wireless terminal obtain a temporary internet protocol address. A temporary internet protocol address is then assigned to the terminal in response to a request from the terminal initiated in response to the page so that data communication can be established with the terminal based on the temporary address.

14 Claims, 2 Drawing Sheets ained in the SMS message itself and the messages are of
NETWORK-INITIATED METHOD AND SYSTEM FOR ESTABLISHING DATA COMMUNICATION USING IP WITH A WIRELESS TERMINAL This application is a continuation of U.S. patent application Ser. No. 10/980,306, filed Nov. 4, 2004, now U.S. Pat. No. 7,940,730, the content of which is hereby incorporated by reference in its entirety into this disclosure.

BACKGROUND OF THE INVENTION

1. Field of the Invention

The present invention relates to a method and system for establishing data transmission, including packetized voice communication, over a wireless network, such as a cellular network, and, more particularly, relates to a system and a network-initiated method and system for providing an Internet Protocol (IP) setup to enable a data transmission with a wireless terminal using IP.

2. Description of the Related Art

Consumer demand has steadily increased for Voice over Internet Protocol (VoIP) services. In VoIP, a voice message is transmitted as packetized digital data in the same manner as an internet transmission, rather than as a traditional circuit switched voice call over the public Switched Telephone Network (PSTN). VoIP offers savings to an organization with many locations in that a single data network can be used for both data and voice communications. Further, an individual user can make a VoIP call to anywhere in the world by accessing an internet web site and only be charged for web usage. As the demand by consumers for wireless communications increases, analysts predict that consumers will demand VoIP and other IP data transmissions from wireless providers. Apart from VoIP, data communication using wireless terminals is increasing in popularity, with E-mail, text messages, games, software updates, and many other applications being available through wireless networks.

Wireless communication over IP requires that a Packet Data Protocol (PDP) context be established between the wireless terminal and the Serving Gateway Service Node (SGSN). Once the wireless terminal requests and initiates a PDP context with the SGSN, the Global Gatework Service Node (GGSN) assigns an IP address to the wireless terminal and registers that address. Due to the limited number of IP addresses that are assigned to each wireless provider and the very large number of wireless terminals in existence, each wireless terminal cannot have a permanent IP address. Further, the network only assigns a dynamic IP address when the wireless terminal, at the initiative of the user, requests one.

Because a wireless terminal must request and obtain an IP address to establish a PDP context and communicate by IP, a problem arises when an originating terminal or application (for example, a push service) wishes to transmit data via IP to a wireless terminal. Specifically, if the receiving terminal has not previously obtained a dynamic IP address, the originating terminal will not be able to transmit data over a data channel because the receiving terminal, and user, do not know that the originating terminal or application is attempting to set up an IP session. It is, of course, desirable that wireless terminals be able to receive VoIP calls and data transmissions from any number of applications under these circumstances. However, without prompting, there is currently no way for the receiving terminal to know to request and obtain an IP address in this situation.

A common current method of data transmission uses the Short Message Service (SMS). SMS messaging can be used to supply limited amounts of data over the control channel to a mobile terminal. In this regard, the data to be transmitted is contained in the SMS message itself and the messages are of limited length. Although the SMS messages are relatively short, if a large number of SMS messages are sent, a relatively large amount of bandwidth will be required. More specifically, although SMS messages are individually of relatively short duration and the control channel usually has available bandwidth, the concern is that, in the future, the expected increase in SMS transmissions will overload the control channel and require the use of a second or third control channel. In fact, this is already the case in some systems, i.e., the systems currently experience control channel congestion during busy hours, and there are systems which replace one or more voice or data channels with an additional control channel or channels. Because the provision of such a further control channel would be (or is) at the expense of a valuable voice or data channel this is obviously something to be avoided.

SUMMARY OF THE INVENTION

In accordance with an important aspect of the invention, a method is provided. The method solves the problems discussed above associated with the inability of an originating terminal or application to conduct a data session in an IP setting with a wireless terminal that has not previously obtained an IP address.

In one important implementation thereof, the system and method of the invention use existing technology and network protocols configured and programmed to initiate data communication using IP with a receiving wireless terminal. As indicated above, once a wireless terminal establishes an IP address, the terminal can transmit and receive IP transmissions, and, generally speaking, the system and method of the invention provide that a wireless network initiate the IP setup by sending a page over the control channel to "wake up" the wireless terminal with an instruction to request and obtain an IP address. The system and method preferably make use of control channel paging that is traditionally used to begin a voice session, rather than in establishing a PDP context for data transmission. Such a page requires significantly less bandwidth than an SMS message; typically, 40 pages are equal to one SMS message in terms of bandwidth.

In one preferred embodiment, the page is a standard, application-based instruction and instructs the terminal to obtain an IP address. It will be understood that such an application can be any application that is attempting an IP transport to a wireless terminal. The application will communicate with the Mobile Switching Center (MSC) and request that the page be sent to the wireless terminal. More particularly, in this embodiment, the application tells the MSC to page the wireless terminal with a Simple Network Management Protocol (SNMP) request so the terminal, in response, obtains an IP address.

In accordance with one aspect of the invention, there is provided a method for establishing data communication between a wireless network and a mobile wireless terminal by means of a packet data protocol connection, using internet protocol, the method including:

initiating a page from the wireless network to the wireless terminal over a control channel requesting that the wireless terminal obtain a temporary internet protocol address;

assigning a temporary internet protocol address to the wireless terminal in response to a request from the wireless terminal initiated in response to the page; and establishing data communication with the wireless terminal based on the temporary internet protocol address.

In accordance with a further aspect of the invention, there is provided a system for establishing data communication between a wireless network and a mobile wireless terminal by means of a packet data protocol connection, using internet protocol, the system comprising the above functions.

In one preferred implementation, the page comprises a standard command issued by an application to the MSC and utilizing recognized industry requirements for messages and call flow.

Advantageously the temporary internet protocol address is communicated back to the wireless terminal and on to the requesting application.

Preferably, the request from the wireless terminal is initially received by a Serving Global Support Node (SGSN) of the network, which establishes a packet data protocol context. Advantageously, when a packet network protocol context is established, a Global Gateway Support Node (GGSN) assigns said internet protocol address to wireless terminal and registers the address.

According to a further aspect of the invention, there is provided a method for establishing data communication with a mobile wireless terminal using internet protocol over a wireless communication system including a control channel and at least one data channel, the method including:

determining whether the wireless terminal is active;

if the wireless terminal is active, determining whether the wireless terminal has an internet protocol address;

if the wireless terminal does not have an internet protocol address, initiating a page over the control channel of the wireless communication system requesting that the wireless terminal obtain a temporary internet protocol address;

assigning a temporary internet protocol address to the wireless terminal in response to a request from the wireless terminal initiated in response to said page; and establishing data communication with the wireless terminal on the data channel based on the temporary internet address assigned to said terminal.

According to a further aspect of the invention, there is provided a system for establishing data communication with a mobile wireless terminal using internet protocol over a wireless communication system including a control channel and at least one data channel, the system comprising the above functions.

In accordance with another aspect of the invention, there is provided a wireless communication system including a base station and a remote wireless terminal, the base station including at least one processor for establishing data communication between a sending wireless terminal and the remote wireless terminal by means of a packet data protocol connection, using internet protocol, the at least one processor initiating a page to the remote wireless terminal over a control channel requesting that the wireless terminal obtain a temporary internet protocol address, and said remote wireless terminal sending a request for a temporary internet protocol address to said at least one processor in response to said page, and said base station further including address registration means for assigning a temporary internet protocol address to the wireless terminal in response to said request from the remote wireless terminal so as to and establish data communication between the sending wireless terminal and the remote wireless terminal based on said temporary internet protocol address.

Preferably, the address registration means includes a SGSN and an GGSN.

In accordance with yet another aspect of the invention, there is provided a computer readable medium having stored thereon at least one sequence of instructions for causing at least one processor to perform a method for establishing data communication between a wireless network and a wireless terminal by means of a packet data protocol connection, using internet protocol, said method including:

causing transmission of a page from the wireless network to the wireless terminal over a control channel requesting that the wireless terminal obtain a temporary internet protocol address;

assigning a temporary internet protocol address to the wireless terminal in response to a request from the wireless terminal initiated in response to said page; and establishing data communication with the wireless terminal based on said temporary internet protocol address.

Further features and advantages of the present invention will be set forth in, or apparent from, the detailed description of preferred embodiments thereof which follows.

DETAILED DESCRIPTION OF THE INVENTION

A system or method in accordance with the present invention may serve various multi-technology wireless devices providing voice, data, and any other content. The technologies employed may use digital or combination digital-analog technology and methods. In a preferred embodiment, the method of the invention uses, but is not limited to, the GSM and TDMA wireless network protocols. Further, the term wireless terminal, as used herein, includes all user devices which are (i) capable of wireless communication of any type of information content using any transmission method, standard, or protocol, and (ii) capable of monitoring a control channel or otherwise able to receive a command or instruction from the wireless network to request an IP address. In important implementations of the invention, the wireless terminal is one which has a data channel and a control channel although it is also possible to add a control channel to a wireless terminal having a data communication capability. In important implementations, the wireless terminal may be a standard mobile cellular device or a standard device equipped with a GPRS (General Packet Radio Services) or EDGE (Enhanced GPRS) card.

Figure 1:
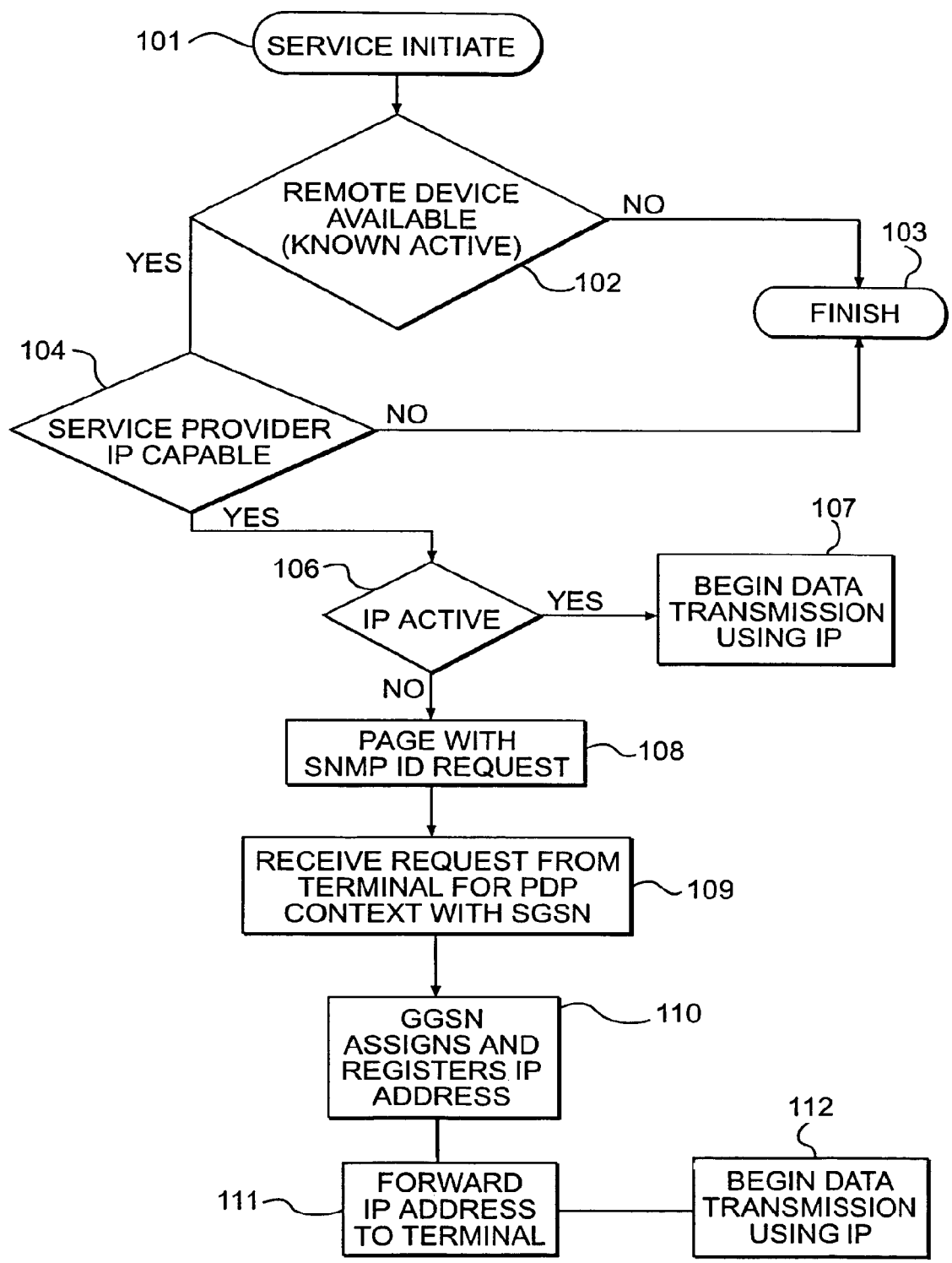
FIG. 1 is a flow chart of a preferred embodiment of the method of the invention.

Referring now to the figures, FIG. 1 is a flow chart of a preferred embodiment of the network-initiated wireless terminal IP setup method of the invention. In order to begin a VoIP session or, more generally, transmit data to a receiving wireless terminal using an IP context, a sending wireless terminal or other application seeking to establish an IP communication with the receiving wireless terminal, may, as indicated by block 101, initiate the session by initiating a call or sending a message to the wireless network providing service to the receiving wireless terminal. As indicated by decision diamond 102 the serving wireless network, using conventional prior art processes and protocols, locates the receiving wireless terminal and determines whether the receiving wireless terminal is active, i.e., available for communication.

As illustrated by block 103, if the system is not able to locate the receiving terminal or the receiving wireless terminal is not available for communication, i.e., the decision is "NO," the system terminates the communications session as illustrated by block 103, and may or may not notify the sending wireless terminal.

If the remote wireless terminal is available, i.e., the decision is "YES," the system next determines whether the receiving terminal and its service provider are IP capable. This is illustrated by decision diamond 104 and if the answer is "NO," the session is again terminated as indicated by the connection to "Finish" block 103. Again, the system may or may not notify the sending wireless terminal.

If the service provider is IP capable, i.e., the decision is "YES," the network determines whether the receiving wireless terminal is IP active and, therefore, has already been assigned an IP address. This is illustrated by decision diamond 106. If the answer is "YES" the system begins transmission of data or voice over IP using standard IP communications between the initiating terminal or application and the receiving wireless terminal using their respective IP addressees and the digital transmission of data over traffic channels to the receiving wireless terminal at its assigned IP address. This is illustrated by block 107.

Up to this point, the method described is essentially conventional. As discussed above, a serious problem arises when the receiving wireless terminal does not have an IP address. This is, of course, represented by the "NO" branch of decision diamond 106. As illustrated by block 108, if the receiving wireless terminal does not have an active IP address, the network will then page the terminal over the control channel and, more particularly, will send a "request for ID" page. In a preferred embodiment, the page used is a standard instruction in the internet Simple Network Management Protocol (SNMP). The transmitted packet itself contains the instructions for the page request and may be constructed in many different ways.

In response to such a page, the receiving wireless terminal will request an IP address so as to establish a PDP context with the SGSN of the network. As indicated by block 109 this request is received by the network and the SGSN will then request an IP address from the GGSN. In response, the GGSN will assign and register an IP address for the receiving wireless terminal, as is represented by block 110. This address is also forwarded to the wireless terminal (see block 111). It will be understood that once the receiving terminal has been assigned an IP address by the GGSN, transmission of data or voice over IP using standard IP communications can take place between the initiating terminal or application and the receiving wireless terminal using their respective IP addresses, as can digital transmission of data over traffic channels to the receiving wireless terminal at its assigned IP address.

Figure 2:
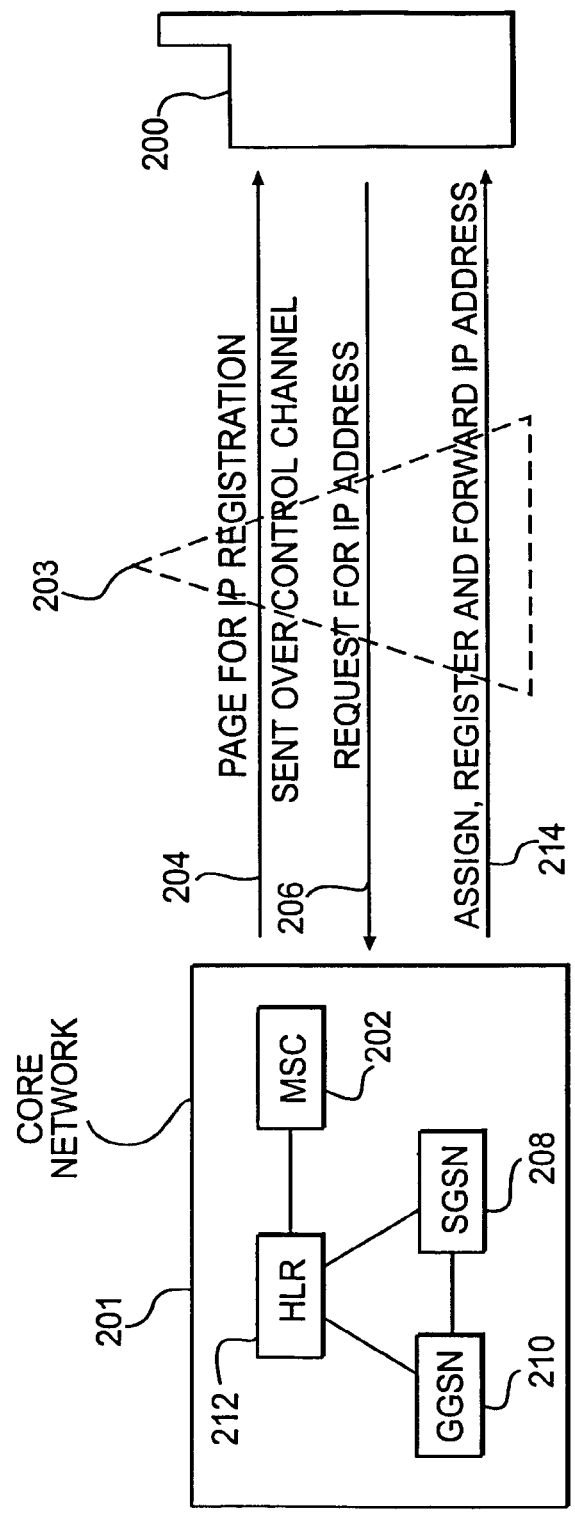
FIG. 2 is a schematic diagram illustrating a method and system in accordance with a preferred embodiment of the invention.

Referring to FIG. 2, there is shown a highly schematic representation of a system for providing that a wireless terminal, denoted 200, obtains an IP address. As discussed above, in order to establish data communications using IP with the wireless terminal 200 when terminal 200 does not have an IP address, the MSC 202 of a core network 201 sends to terminal 200 a page, preferably for IP SNMP information, denoted 204, i.e., a command or instruction to deliver an IP address. The overall wireless system may, of course, include a communication tower or towers indicated in dashed lines at 203. The page causes terminal 200 to transmit a request for an IP address, as indicated at 206, i.e., to request a PDP context from the SGSN 208 of the core network 201. SGSN 208 is coupled to the GGSN 210 of the core network 201.

As indicated schematically in FIG. 2, a home location registry (HLR) 212 is interconnected with the SGSN 208, GGSN 210, and the MSC 202. The HLR 212 functions in the address registration process by first interrogating other components (i.e., the GGSN 210) to determine whether or not the wireless terminal 200 has an IP address. If so, the HLR 212 will then establish the link through the GGSN 210 and SGSN 208 and the transmission thereafter progresses. However, if the wireless terminal 200 does not have an IP address, the terminal 200 will follow the normal process of contacting the SGSN 208 and GGSN 210 for an address and ultimately returning that address to the HLR 212.

Considering this address registration process in more detail, when terminal 200 transmits a request for a PDP context from the SGSN 208, SGSN 208 then establishes a PDP context with the wireless terminal 200 and signals the GGSN 210 which, as indicated by arrow 214, assigns the wireless terminal 200 a temporary, dynamic IP address, registers the address with the IP computer network and forwards the address to the terminal 200. In this way, the wireless terminal 200 is thus provided with an IP identifier to be used to identify the terminal on the IP computer network for IP communications. As indicated above, the HLR 212 is also updated with this information.

As will be apparent from the foregoing, the present invention provides a simple yet highly effective way of establishing IP data communications with a wireless terminal (i.e., a terminal corresponding to terminal 200) that has not been assigned an IP address. By sending a simple very short "request IP address" page 204 over the system control channel, substantial bandwidth can be saved as compared with SMS messaging. In this regard, as indicated above, a page typically requires 1/40 of the bandwidth of an SMS message and, moreover, rather than incorporate the data in the SMS message, once the terminal 200 obtains an IP address, IP data communications can take place over the data channels in a normal manner. As mentioned previously, the page 204 can be an existing internet (SNMP) command and the system can use existing hardware and protocols.

Although the invention has been described above in relation to preferred embodiments thereof, it will be understood by those skilled in the art that variations and modifications can be effected in these preferred embodiments without departing from the scope and spirit of the invention.

What is claimed is:

1. A method comprising:
   receiving, at a wireless network comprising a serving general packet radio service support node, a request to initiate an internet protocol session with a wireless terminal in communication with the wireless network, the request being received from the wireless terminal;
   determining that the wireless terminal is available;
   determining that the wireless terminal is internet protocol capable;
   determining that the wireless terminal does not have an internet protocol address;
   paging the wireless terminal over a control channel, wherein paging comprises sending a page comprising a standard instruction in a simple network management protocol to request that the wireless terminal obtain a temporary internet protocol address;
   receiving, at the serving general packet radio service support node, a request for the temporary internet protocol address from the wireless terminal;
   obtaining, by the serving general packet radio service support node, the temporary internet protocol address;
   assigning the temporary internet protocol address to the wireless terminal; and
   establishing the internet protocol session between the wireless network and the wireless terminal.

2. The method of claim 1, wherein the serving general packet radio service support node requests the temporary internet protocol address from a gateway general packet radio service support node of the wireless network.

3. The method of claim 2, wherein the gateway general packet radio service support node of the wireless network assigns and registers the temporary internet protocol address for the wireless terminal.

4. The method of claim 2, wherein the serving general packet radio service support node establishes a packet data protocol context with the wireless terminal.

5. The method of claim 1, wherein the temporary internet protocol address comprises a temporary dynamic internet protocol address.

6. The method of claim 1, wherein determining that the wireless terminal does not have the internet protocol address comprises instructing a home location register of the wireless network to interrogate a gateway general packet radio service support node of the wireless network to determine whether the wireless terminal has been assigned the internet protocol address, and determining that the wireless terminal has not been assigned the internet protocol address.

7. The method of claim 1, wherein the internet protocol session comprises a voice over internet protocol session.

8. A non-transitory computer readable medium having stored thereon instructions that, when executed by a processor, causes the processor to perform operations comprising:
   receiving a request to initiate an internet protocol session with between a wireless network and a wireless terminal, the wireless network comprising a serving general packet radio service support node, the request being received from the wireless terminal;
   determining that the wireless terminal is available;
   determining that the wireless terminal is internet protocol capable;
   determining that the receiving wireless terminal does not have an internet protocol address;
   paging the wireless terminal over a control channel to request that the wireless terminal obtain a temporary internet protocol address, wherein paging comprises sending a page comprising a standard instruction in a simple network management protocol;
   receiving a request for the temporary internet protocol address from the receiving wireless terminal;
   obtaining the temporary internet protocol address from a gateway general packet radio service support node;
   assigning the temporary internet protocol address to the wireless terminal; and
   establishing the internet protocol session between the wireless network and the wireless terminal.

9. The non-transitory computer readable medium of claim 8, wherein the determining that the receiving wireless terminal does not have the internet protocol address comprises instructing a home location register of the wireless network to interrogate the gateway general packet radio service support node of the wireless network to determine that the receiving wireless terminal has not been assigned the internet protocol address.

10. A method comprising:
    receiving, at a wireless network comprising a serving general packet radio service support node and a gateway general packet radio service support node, a request to initiate an internet protocol session with a wireless terminal in communication with the wireless network, the request being received from the wireless terminal;
    determining that the wireless terminal is available;
    determining that the wireless terminal is internet protocol capable;
    determining that the wireless terminal does not have an internet protocol address;
    requesting that the wireless terminal obtain a temporary internet protocol address by transmitting a page to the wireless terminal over a control channel, the page comprising a standard instruction in a simple network management protocol;
    receiving a request for the temporary internet protocol address from the wireless terminal;
    obtaining, from the gateway general packet radio service support node, the temporary internet protocol address;
    assigning the temporary internet protocol address to the wireless terminal; and
    establishing the internet protocol session between the wireless network and the wireless terminal.

11. The method of claim 10, wherein the gateway general packet radio service support node assigns and registers the temporary internet protocol address for the wireless terminal.

12. The method of claim 10, wherein the serving general packet radio service support node establishes a packet data protocol context with the wireless terminal.

13. The method of claim 10, wherein the temporary internet protocol address comprises a dynamic internet protocol address.

14. The method of claim 10, wherein the internet protocol session comprises a voice over internet protocol session.

* * * * *